United States Patent
Toncelli et al.

(10) Patent No.: US 11,292,100 B2
(45) Date of Patent: Apr. 5, 2022

(54) MACHINE TOOL AND METHOD FOR CONTROLLING TEMPERATURE VARIATIONS IN A MACHINE TOOL

(71) Applicant: BRETON SPA, Castello di Godego (IT)

(72) Inventors: Luca Toncelli, Bassano del Grappa (IT); Claudio Saurin, Rubano (IT); Riccardo Trojetto, Resana (IT)

(73) Assignee: BRETON SPA, Castello di Godego (IT)

( * ) Notice: Subject to any disclaimer, the term of this patent is extended or adjusted under 35 U.S.C. 154(b) by 9 days.

(21) Appl. No.: 16/617,544

(22) PCT Filed: Jun. 1, 2018

(86) PCT No.: PCT/IB2018/053941
§ 371 (c)(1),
(2) Date: Nov. 27, 2019

(87) PCT Pub. No.: WO2018/224931
PCT Pub. Date: Dec. 13, 2018

(65) Prior Publication Data
US 2020/0122284 A1 Apr. 23, 2020

(30) Foreign Application Priority Data
Jun. 5, 2017 (IT) .................. 102017000061222

(51) Int. Cl.
*B23Q 11/14* (2006.01)
(52) U.S. Cl.
CPC .......... *B23Q 11/141* (2013.01); *B23Q 11/143* (2013.01)

(58) Field of Classification Search
CPC .................... B23Q 11/141; B23Q 11/143
See application file for complete search history.

(56) References Cited

U.S. PATENT DOCUMENTS

| | | | | |
|---|---|---|---|---|
| 2,221,127 A | * | 11/1940 | Bates | B23F 23/12 409/11 |
| 4,521,661 A | * | 6/1985 | Inoue | B23H 7/02 219/69.11 |
| 5,125,163 A | * | 6/1992 | Bury | G01B 5/0014 33/573 |
| 5,197,537 A | * | 3/1993 | Chigira | B23Q 11/141 165/291 |

(Continued)

FOREIGN PATENT DOCUMENTS

| CH | 660322 A5 * | 4/1987 | .......... B23Q 11/145 |
|---|---|---|---|
| DE | 3318199 A1 | 11/1984 | |

(Continued)

OTHER PUBLICATIONS

PCT International Search Report and Written Opinion dated Sep. 24, 2018 for International Application No. PCT/IB2018/053941, from which the instant application is based, 9 pgs.

*Primary Examiner* — Eric A. Gates
(74) *Attorney, Agent, or Firm* — Fredrikson & Byron, P.A.

(57) ABSTRACT

A machine tool comprises a structure in which at least one component (12) of this structure is thermally insulated from the external environment and in which this component (12) is sealed so as to prevent fluid communication between the inside (18) and the outside of the component (12) of the structure.

15 Claims, 6 Drawing Sheets

(56) References Cited

U.S. PATENT DOCUMENTS

| | | | | |
|---|---|---|---|---|
| 6,675,549 B1 * | 1/2004 | Kaneda | ................ | B23Q 11/148 |
| | | | | 52/749.1 |
| 6,688,871 B1 * | 2/2004 | Lee | .......................... | B23Q 3/08 |
| | | | | 29/527.6 |
| 10,118,268 B2 * | 11/2018 | Saito | .................... | B23Q 11/141 |

FOREIGN PATENT DOCUMENTS

| | | | |
|---|---|---|---|
| DE | 102012011206 A1 | 12/2012 | |
| DE | 202014105522 U1 | 2/2016 | |
| EP | 1405695 A1 | 4/2004 | |
| EP | 1629940 A2 * | 3/2006 | ........... B23Q 11/141 |
| JP | H07136895 A | 5/1995 | |
| JP | 2003174275 A | 6/2003 | |
| JP | 2012066312 A | 4/2012 | |
| RU | 2167744 C2 | 5/2001 | |
| SU | 294710 A1 | 2/1971 | |
| SU | 850351 A1 | 7/1981 | |

\* cited by examiner

MACHINE TOOL AND METHOD FOR CONTROLLING TEMPERATURE VARIATIONS IN A MACHINE TOOL

RELATED APPLICATIONS

This application is a 35 U.S.C. 371 national stage filing from International Application No. PCT/IB2018/053941, filed Jun. 1, 2018, which claims priority to Italian Application No. 102017000061222, filed Jun. 5, 2017, the teachings of which are incorporated herein by reference.

The present invention relates to a machine tool and a method for controlling temperature variations in a machine tool and in particular to a method for preventing or at least limiting temperature variations in a machine tool.

As is known, machine tools and in particular their structural components, which are normally made of metal, during machining may be subject to local temperature fluctuations due to variations in the ambient temperature (i.e. temperature of the room where they are arranged). For example, the variations may be due to air currents or irradiation due to direct or indirect sunlight.

This gives rise to two effects, which are both related to the thermal conductivity of the material forming the structure:
the temperature of the machine structures may vary from one instant to another; and
for a same instant the temperature at one point of the machine or one of the structures forming it may be different from the temperature at another point.

Consequently, depending on the thermal expansion coefficient of the metallic materials forming the structures, they expand or retract in accordance with the variation in temperature.

These variations in temperature cause varying expansion and therefore geometrical deformation of the structure and therefore have direct consequences on the machining precision which is required of the machine tools. In fact, very often the dimensional tolerance with which the manufactured article must be made is extremely small, often a few hundredths of a millimetre.

Therefore, both the temperature variations over time and the local differences in temperature produce deformations which result in imprecise positioning of the machining tool and therefore a lack of precision which may become unacceptable in terms of the actual machining results obtained compared to the theoretical machining performance.

In order to overcome this major drawback, a known measure is to arrange the machine in an air-conditioned environment which is kept as far as possible at a constant fixed temperature. However, keeping a large-size environment at a more or less constant temperature is not easy and in particular is very costly.

In fact, normally the environment in which the machine is positioned communicates with adjacent environments, and even with the external environment, by means of access points which are closed by doors or shutters for allowing the entry of persons and/or means necessary for operation of the machine tool. Whenever the door or shutter is opened, air enters from the adjacent environment or from the outside and this causes a variation in the temperature of the air-conditioned environment.

Keeping the temperature at a constant value, in addition to requiring major investment, also involves high operating costs.

Also known is the solution proposed by European patent EP 1405695 where the components of the machine structure are enclosed by housings. Air drawn from outside the structure, suitably cooled, is circulated between the structure and housing and flows through openings controlled by valves which are operated depending on the temperature of the zone of the structure which is to be cooled. In other words, the air-conditioning is transferred from the environment to a much smaller space which encloses machine only (or one of its components).

This solution, although advantageous, is not without drawbacks; in fact it is necessary to:
provide several temperature sensors positioned on various points of the machine;
completely cover the machine, creating in the interspace between machine and housing channels or ducts through which the cooled air may pass;
install controlled valves for regulating the air flow; and
provide an air-conditioning unit, in particular a cooling unit, for cooling the air drawn from the outside and means for circulating the air between the structure and housing.

Moreover, regulation of the controlled valves is also not easy at all since it is difficult to establish the degree and the duration of opening or closing of the valve depending on the temperatures detected.

The object of the invention is therefore to solve substantially the drawbacks of the prior art. A first task of the present invention is to provide a numerical control machine tool which is minimally affected by variations in temperature of the environment which may cause geometrical deformations of the structure.

A second task of the present invention is to provide a solution which is simple, efficient and low-cost, so as not to increase significantly the final cost of the machine tool.

The object and the tasks are achieved with a machine tool according to claim 1 and with a method for limiting temperature variations in a machine tool according to claim 13.

According to the invention, at least one component of the machine tool, but preferably the entire machine tool or at least its main parts, is thermally insulated by means of a layer of insulating material applied onto its outer surface and this component is also sealed so as to prevent fluid communication between the inside and the outside of the component. The machine tool may comprise means for causing a movement or forced circulation of air inside the structure of the at least one component.

Figure 1:
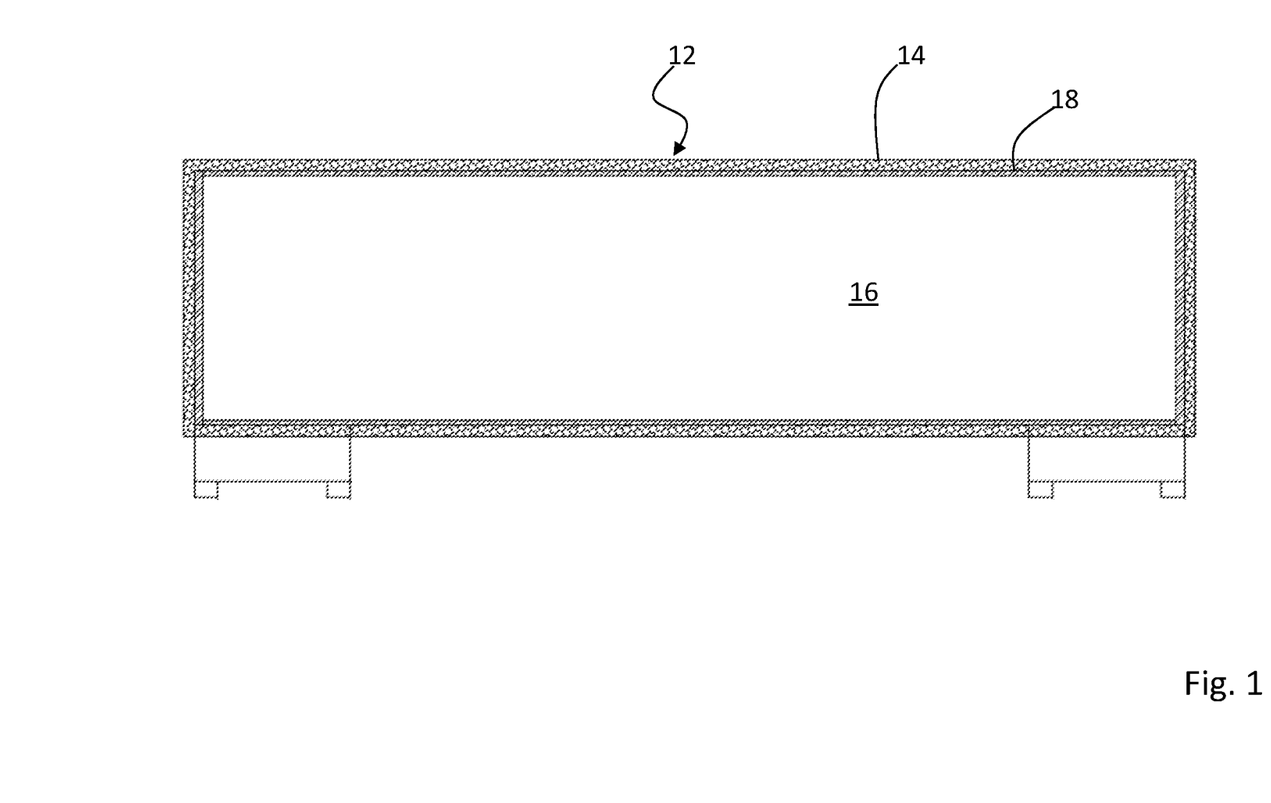
FIG. 1 shows in schematic form a longitudinal section through a component of a structure according to the present invention.

The advantages and characteristic features of the present invention will emerge more clearly from the detailed description below of a number of examples of embodiment provided by way of a non-limiting example, with reference to the attached drawings in which:

FIG. 1 shows a component of a machine tool according to the present invention, which is indicated by the generic reference number 12. In particular, FIG. 1 shows in schematic form a beam which is designed to be moved above two lateral support structures (not shown) and on which a carriage is slidably displaced.

The machine tool according to the present invention comprises a structure in which at least the component 12 is provided with a lining 14 designed to ensure thermal insulation of the component 12 with respect to the external environment and in which this component 12 is sealed so as to prevent fluid communication between the inside 16 and the outside of the component 12 of the machine.

The lining 14 may be made of heat-insulating material, such as polystyrene or expanded polyurethane. According to alternative embodiments of the present invention, the lining 14 may include intermediate layers of specific insulating material, such as glass wool, rock wool, etc.

The lining 14 may be advantageously applied directly onto the outer surface 18 of the component 12 of the machine or kept at a small distance.

The function of the lining 14 is to reduce substantially the transmission of the heat from the external environment to the component 12 of the machine and therefore attenuate the temperature fluctuations, allowing the component to maintain a uniform temperature owing to the high thermal conduction coefficient of the metal from which it is made.

Therefore, if the temperature of the environment in which the component is located is subject to local variations, these variations influence the component in a delayed manner, allowing time for its temperature to become uniform over the entire metal structure, owing to the high thermal conductivity of the metal.

The lining 14 could also have a reflective outer layer (not shown in the attached figures) applied onto the surface of the lining 14 and designed to reflect any solar radiation which strikes it, thus making it possible to attenuate further the local heating effect caused by the sunlight striking the structure.

Owing to the lining 14, the lack of uniformity of the temperature of the structure following a local variation in temperature of the environment and/or of the sunlight acting locally on it is significantly reduced.

The machine tool according to the present invention may comprise means 20 for causing a movement or forced circulation of the air inside the at least one component 12 of the machine.

Figure 2:
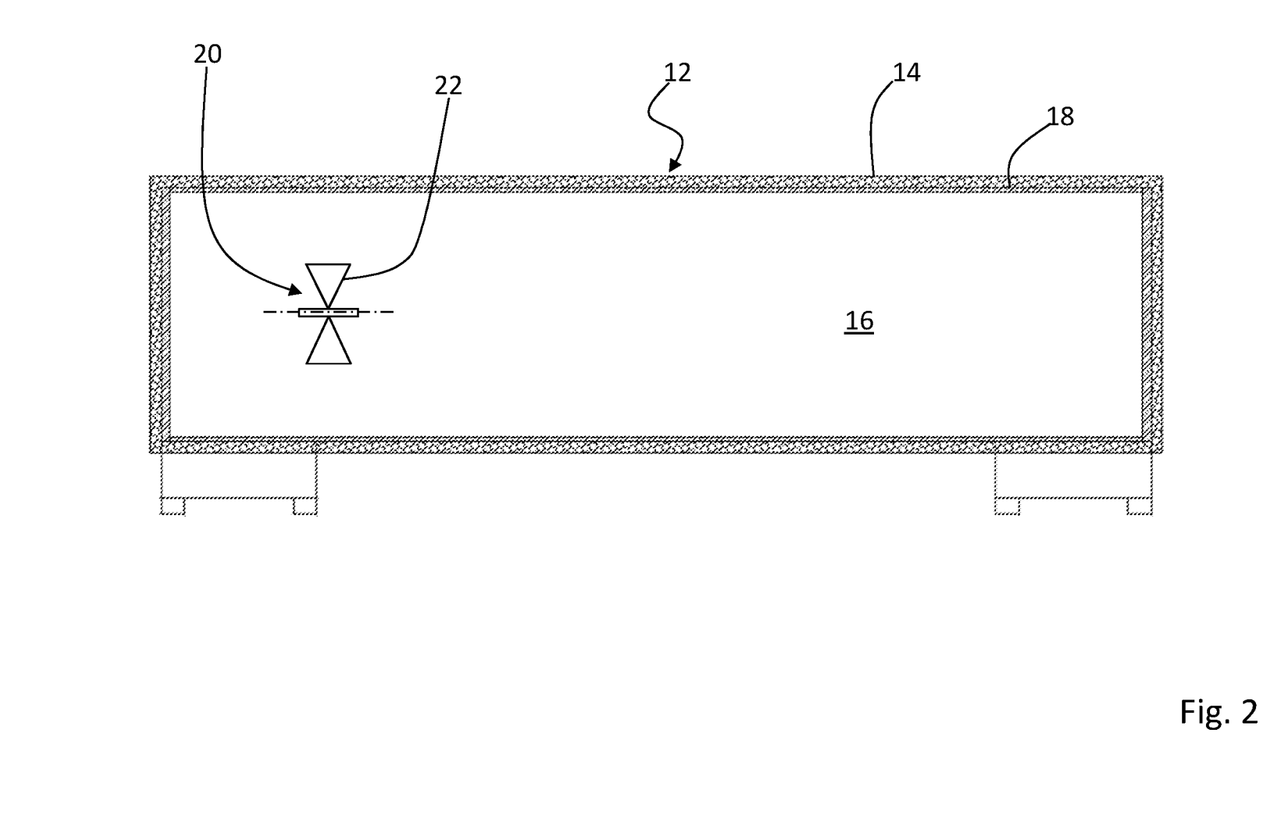
FIG. 2 shows in schematic form a longitudinal section through a component of a structure according to an alternative embodiment of the present invention.

As shown in FIG. 2, the means 20 may comprise at least one blower or fan 22.

In fact, thermal insulation of the structure might not be sufficient alone to prevent differences in temperature between two different zones of the component structure, due for example to air currents or solar radiation striking a specific point of the structure.

These differences in temperature could also be very marked in the case of very long components such as the beam of the machine tool along which a machining unit moves or in the case of sleeves to which machining heads are connected.

The movement or forced circulation therefore has the function of ensuring a uniform temperature in the whole of the structure, which is sealed off from the outside, while ensuring a continuous circulation of air inside the structure.

The air inside the structure, since it is moved mechanically, allows the heat to be spread quickly and uniformly over the structure. In other words, the air is moved and, flowing over the hotter zones of the component, is heated and releases its heat to the colder parts of the said component.

The air tightness of the component is necessary in order to prevent the entry into the structure of air at the same temperature as the ambient temperature, thus diminishing the action of the insulating layer.

The means 20 for providing the forced circulation of air inside the at least one component of the machine structure may comprise at least one duct 24.

According to a possible embodiment of the present invention, the at least one duct 24 is provided at its first end 26 with the blower 22 and is closed at its second end 28, and the surface 30 of the duct 24 is provided with a plurality of holes 32.

The blower 22 draws air from the first end 26 of the duct 24 and propels it inside the duct.

The air then exits from the holes 32 in the duct 24 and is sucked in again by the blower 22.

Figure 3:
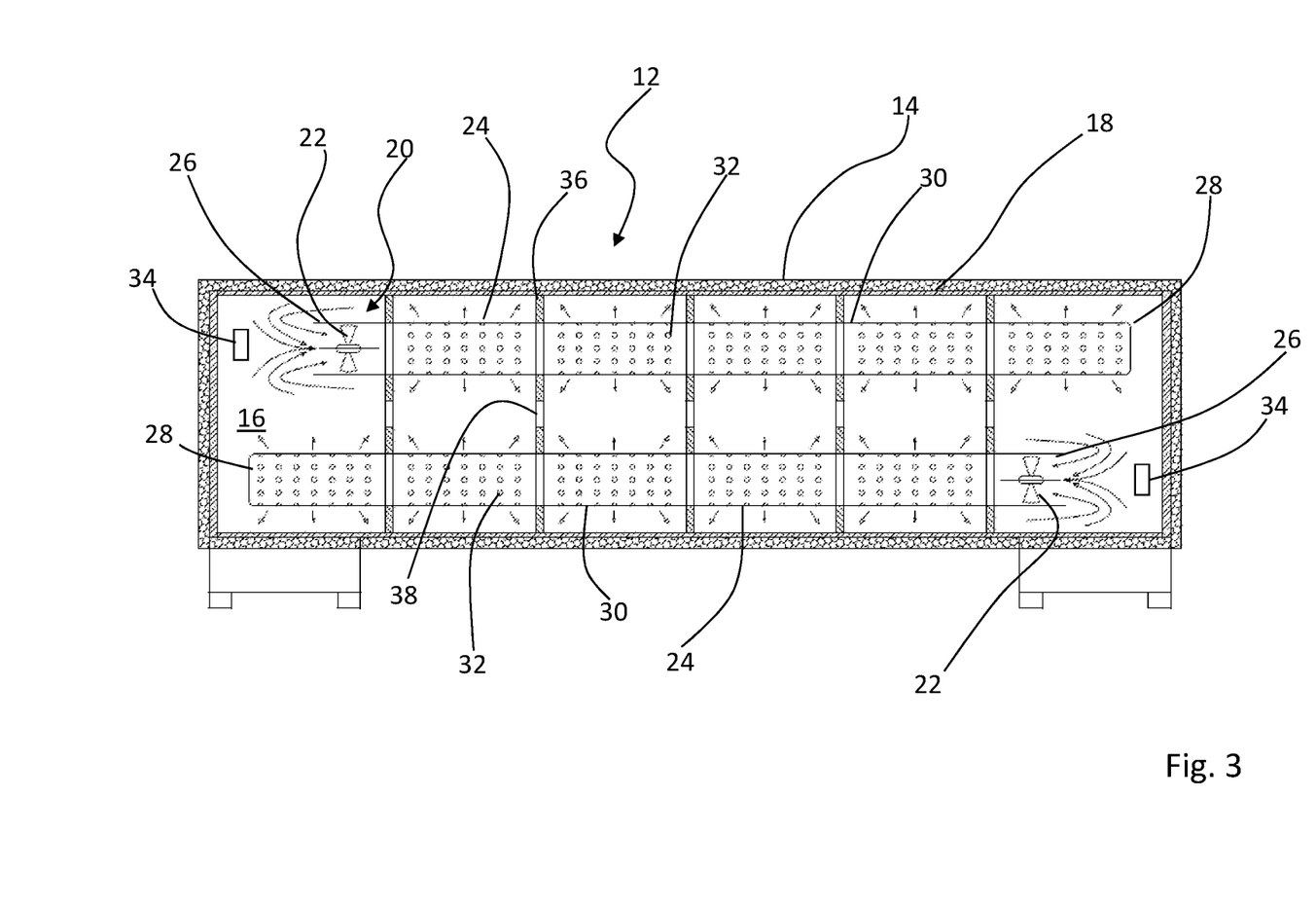
FIG. 3 shows in schematic form a longitudinal section through a component of a structure according to a further alternative embodiment of the present invention.

In a possible embodiment of the present invention, shown in FIG. 3, the component 12 is provided with two ducts 24.

Figure 4:
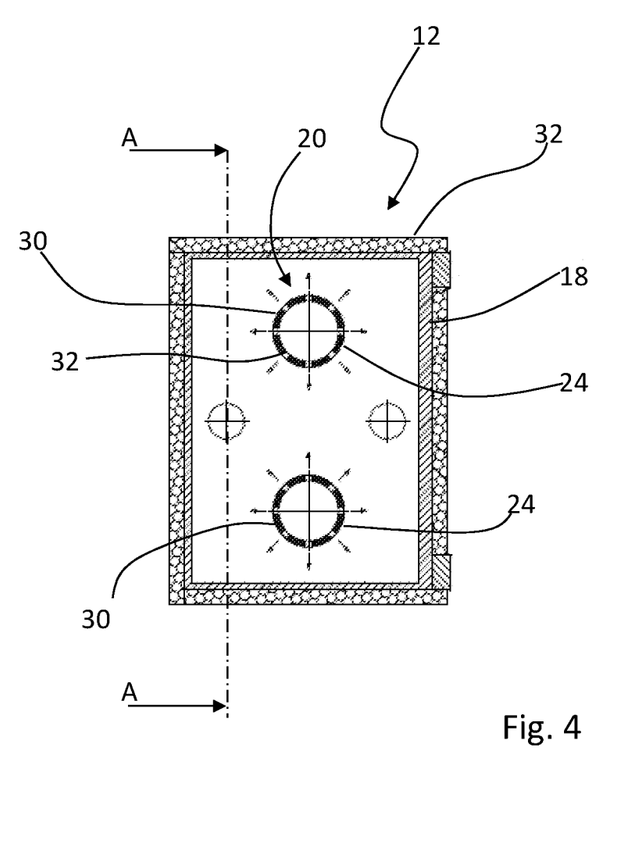
FIG. 4 shows in schematic form a cross-section of a possible embodiment of a component according to the present invention.
Figure 5:
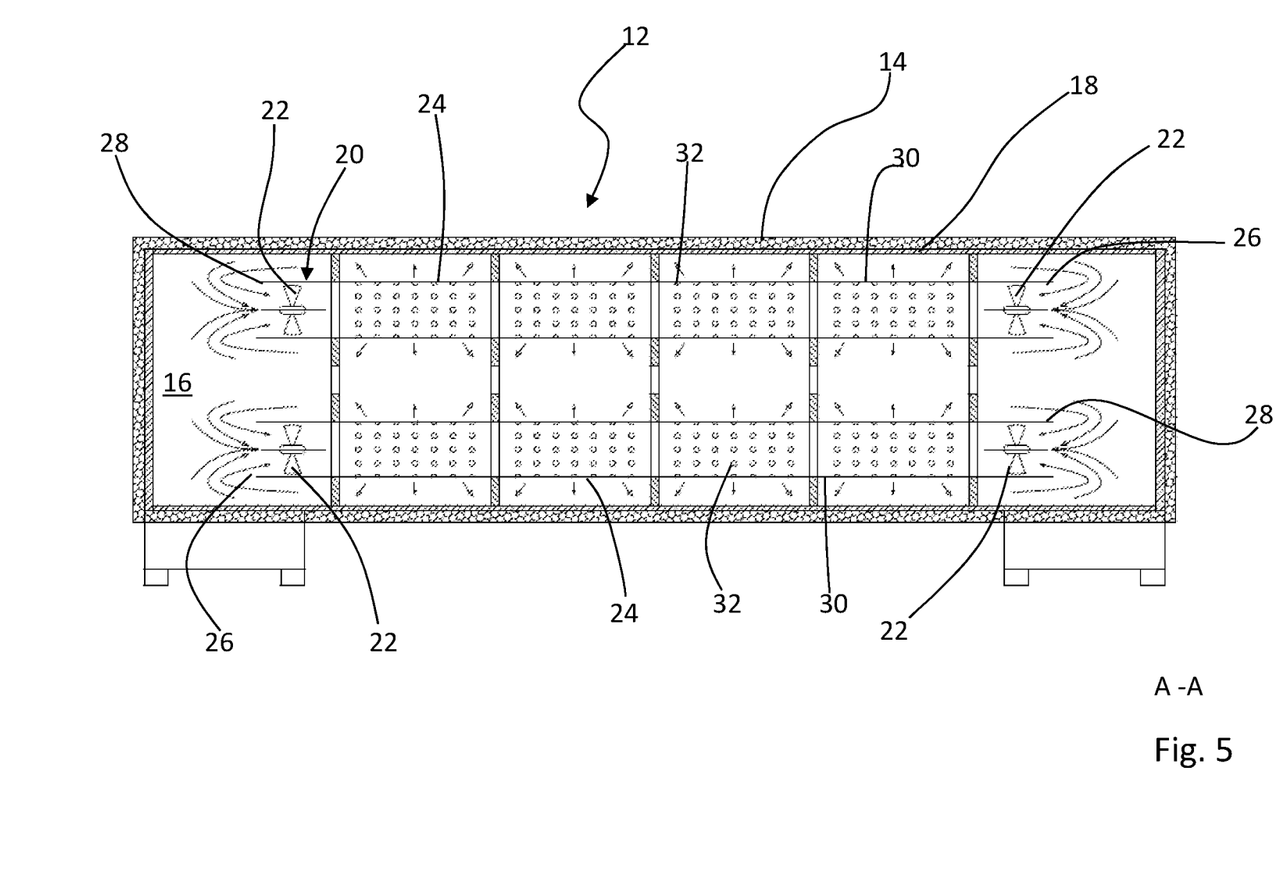
FIG. 5 shows in schematic form a longitudinal section along the cross-sectional plane A-A in FIG. 4.

Advantageously, the at least one duct 24 inside the at least one component 12 of the structure may be provided at both the ends 26, 28 with a blower 22. In this case also, the surface 30 of the duct 24 is provided with a plurality of holes 32. This embodiment is shown in FIG. 5. From the cross-section shown in FIG. 4, it can be seen that the holes 32 are preferably arranged along the whole cross-section of the duct 24.

In the attached figures, the duct is always shown with a circular cross-section, but other cross-sectional forms are possible, such as an elliptical, square, rectangular or polygonal cross-section, as well as cross-sections comprising generic curved lines.

The duct 24 may be straight (as shown in the attached figures). However, the duct 24 may also be curved, so that the air flow may effectively interact with complex internal structures.

It can be noted that, even if the blowers 22 are not present, an air circulation is in any case provided inside the structure as a result of the natural convection which, however, in some cases may not be sufficient. With the presence of the fans, the convection is forced, increasing considerably the heat exchange which takes place between structure and air directly in contact with the structure.

In accordance with alternative embodiments of the present invention, the ducts 24 may be formed so as to be incorporated in the component of the machine tool structure. In other words, the component may be designed so that it is provided internally with a duct through which air may be circulated by means of one or more blowers.

If the structure, following a variation in temperature of the environment, should instead be subject to a variation in its temperature which is different at various points, this would cause deformations which cannot be predicted in any way and therefore cannot be counteracted. Instead, as a result of the action ensuring a uniform temperature inside the structure, these deformations, which in any case are reduced significantly, may be calculated and determined experimentally and may therefore be taken into account and their negative effect eliminated. It is therefore clear that in this way the component will manage to maintain a uniform temperature and therefore the dimensional variation, without deformation, due to the variation of a given temperature value, is of a linear nature. In other words, if the structure should expand, it would expand in the same way in the three spatial directions which, depending on the temperature reached by the structure, may be easily and accurately predicted, both in theory and in practice, and may thus be easily compensated for by means of a control unit (not shown) of the operating machine, based on an associated algorithm. It is therefore possible to provide compensation tables or curves which, when there is a variation in the temperature of the structure, are able to establish the dimensional variations affecting it, such that the algorithm and therefore the control unit may take this into account and compensate for these variations by repositioning the machining tool, eliminating therefore the positioning error.

In accordance with a possible embodiment of the present invention, the at least one component may be provided with heating means 34. The heating means 34 are shown schematically in the embodiment of the present invention shown in FIG. 3.

In accordance with a possible embodiment of the present invention, said heating means 34 may be electrical resistances.

Advantageously, the use of heating means 34 has the task of keeping the temperature of the air inside the structure constant and therefore the structure itself at a value equal to the maximum predicated temperature of the environment.

The heating means may be operationally connected to the control unit of the machine (not shown) so as to be able to be controlled for example with regard to switching on/off thereof and/or the power supply, etc.

If the maximum predicted temperature of the environment in which the machine tool is positioned were for example 25° C., the structure of the machine would also not exceed this temperature. The structure, without heating elements, would reach this limit temperature only if the environment were to remain for a sufficiently long time at the temperature of 25° C. In all the other cases, the temperature of the structure would be lower.

Owing to the heating means 34 it is instead possible to heat the air inside the structure, increasing its temperature, setting it and keeping it at a constant value of 25° C. Control of the temperature may be performed using sensor means (not shown in the attached figures). The sensor means may be of the type known per se to the person skilled in the art and therefore will not be further described.

The sensor means may also be connected to the control unit of the machine. In this way management of heating of the machine, and therefore management of the heating means 34 and the means 20, may be completely automated.

In this way, by keeping the temperature of the structure constant, there is no longer the need to determine the compensation curves for geometrical variations of the structure and to modify the control and management software in order to take account thereof.

The deformations due to local or temporary changes of the temperature outside the structure are practically eliminated, further simplifying the machine and management thereof.

It should also be taken into account that the power required by the electrical resistances is really minimal because the temperature variations are limited. Essentially only the air and the structure, which is well insulated, must be heated. The layer of insulant limits the transmission of the heat from the outside to the inside of the structure, but limits substantially also the transmission of the heat generated internally by the electrical resistances to the outside.

Figure 6:
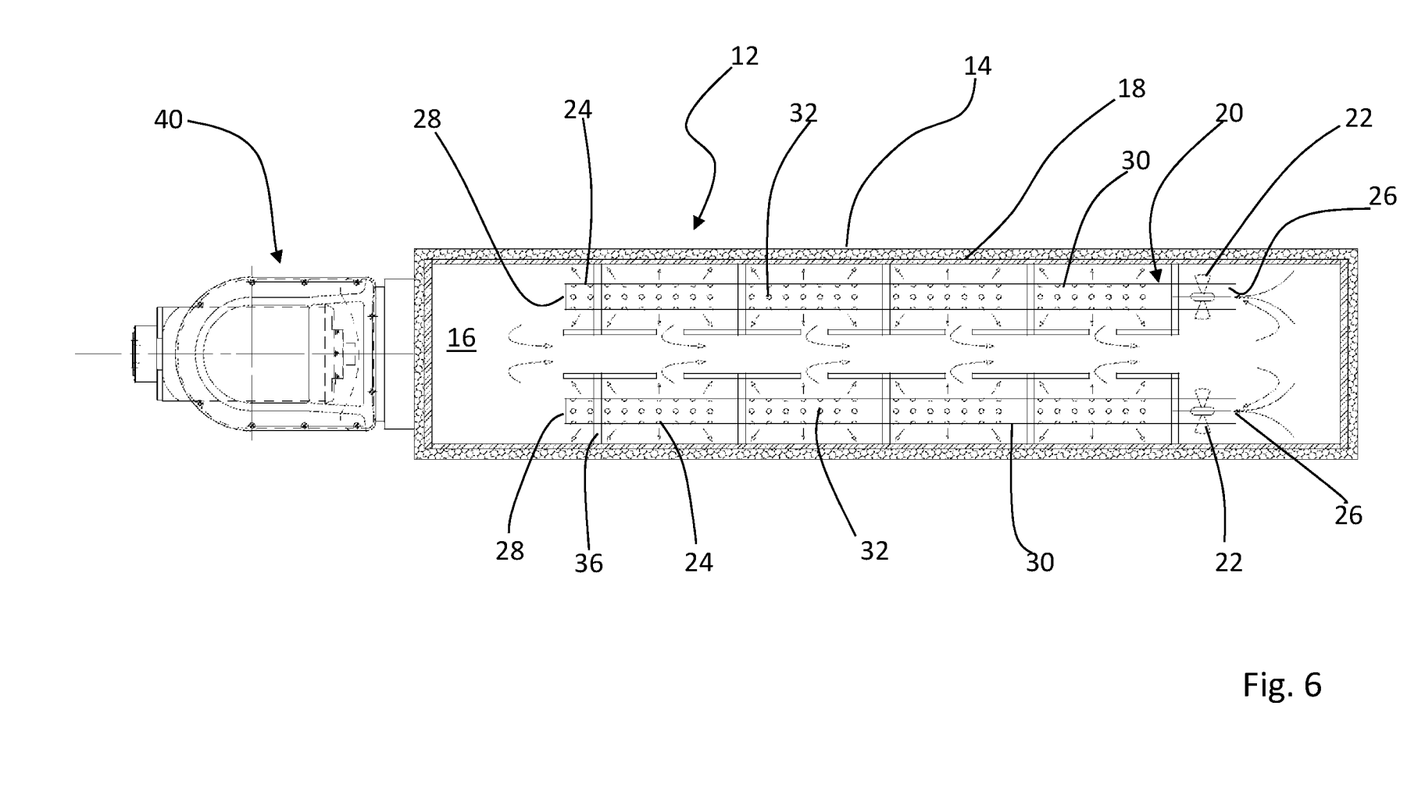
FIG. 6 shows in schematic form a longitudinal section through a sleeve of a machine tool according to the present invention arranged horizontally.

FIG. 6 shows in schematic form a sleeve provided with a machining head 40 to which the principles of the present invention have been applied.

As can be clearly seen in FIGS. 3, 5 and 6, the components 12 of the structure may also be provided with transverse stiffening elements 36 which are provided with at least one hole 38 for allowing the air to pass through so that it may return to the fans and be then propelled inside the respective duct.

In the light of the description above, the method for preventing or at least limiting local temperature variations, and therefore deformations, of the structure of a machine tool may be clearly understood. The method comprises essentially the steps of:
  providing an insulating lining (14) around at least one component (12) of a machine tool;
  sealing said at least one component (12) so that fluid communication between the inside (16) and outside of the structure of the component is prevented;
  and causing a movement or forced circulation of the air inside the component.

Advantageously, the method may comprise a step where the air which is circulated inside the component is heated.

As described above, heating of the air may also be advantageously performed so as to keep the temperature inside the structure of the component constant.

This thus results in a machine with a structural stabilization system for preventing temperature variations which, compared to the machines of the prior art, is decidedly simpler, less costly and the software management of which is simpler.

The person skilled in the art, in order to satisfy specific needs, may make modifications to the embodiments described above and/or replace the elements described with equivalent elements, without thereby departing from the scope of the attached claims.

The invention claimed is:

1. A machine tool comprising at least one structural component provided with a lining designed to thermally insulate the at least one structural component with respect to the external environment and other components of the machine tool, and in which said at least one structural component is sealed so as to prevent fluid communication from an inside of the at least one structural component to an outside of the at least one structural component, and comprising means for causing a movement or forced circulation of air about the inside of the at least one structural component of the machine tool.

2. The machine tool according to claim 1, characterized in that the lining consists of at least one layer of polystyrene, expanded polyurethane, glass wool or rock wool.

3. The machine tool according to claim 1, characterized in that the lining is applied directly onto the outer surface of the component.

4. The machine tool according to claim 1, characterized in that the lining comprises a reflective outer layer applied onto the surface of the lining and designed to reflect any possible solar radiation.

5. The machine tool according to claim 1, characterized in that the means comprise at least one blower.

6. The machine tool according to claim 1, characterized in that the means for providing a forced circulation of air inside the structure of the at least one component of the machine comprise at least one duct.

7. The machine tool according to claim 6, characterized in that the at least one duct is provided at one end with the blower and is closed at its second end, and the surface of the duct is provided with a plurality of holes.

8. The machine tool according to claim 6, characterized in that the component is provided with two ducts.

9. The machine tool according to claim 6, characterized in that the at least one duct inside the structure of the at least one component is provided at both ends with a blower, and the surface of the duct is provided with a plurality of holes.

10. The machine tool according to claim 1, characterized in that it comprises heating means for maintaining a pre-defined temperature inside the structure of the at least one component.

11. The machine tool according to claim 1, comprising means for sensing the temperature at various points of the structure of the at least one component and a control unit which can be programmed for managing the machine depending on the temperature measured by the sensor means.

12. The machine tool according to claim 11, characterized in that the heating means are operationally connected to the control unit so as to be controlled depending on the temperature measured by the sensors.

13. A method for limiting local temperature variations in the structure of at least one component of a machine tool comprising the steps of:

providing a lining around the at least one component of a machine tool to thermally insulate the at least one component with respect to the external environment and other components of the machine tool;

sealing said at least one component so that fluid communication from an inside of the at least one component to an outside of the at least one component is prevented; and causing a movement or forced circulation of air about the inside of the at least one component of the machine tool.

14. The method according to claim 13, comprising a step where the air which is circulated inside the component is heated.

15. The method according to claim 14, according to which heating of the air is performed in order to keep the temperature inside the structure of the component constant.

* * * * *